United States Patent

[11] 3,610,978

[72] Inventor Peter-Konrad Hermann
 Berlin, Germany
[21] Appl. No. 3,110
[22] Filed Jan. 15, 1970
[45] Patented Oct. 5, 1971
[73] Assignee Licentia Patent-Verwaltungs G.m.b.H.
 Frankfurt, Germany
[32] Priority Jan. 15, 1969
[33] Germany
[31] P 19 02 652.9

[54] HYSTERESIS MOTOR
 7 Claims, 12 Drawing Figs.
[52] U.S. Cl. .................................................. 310/163,
 310/43, 310/86, 310/105, 310/268
[51] Int. Cl. ...................................................... H02k 9/26
[50] Field of Search .......................................... 310/162,
 268, 86, 156, 266, 171, 257, 262, 163, 43, 45, 105,
 170

[56] References Cited
 UNITED STATES PATENTS
 2,502,068 3/1950 Anderson ........................ 310/268
 3,031,592 4/1962 Griffiths ......................... 310/257
 3,169,204 2/1965 Moressee ....................... 310/268
 3,219,862 11/1965 Kieffert ......................... 310/257
 3,261,996 7/1966 Fawzy ............................ 310/86
 3,466,479 9/1969 Jarret ............................ 310/268
 2,721,280 10/1955 Dills .............................. 310/45

Primary Examiner—Milton O. Hirshfield
Assistant Examiner—R. Skudy
Attorney—Spencer & Kaye ABSTRACT: An improved stator construction for a hysteresis-type motor and particularly a disc-type hysteresis motor, wherein the slot harmonics in the air gap flux density are removed or at least substantially reduced, thus reducing rotor eddy current losses, wherein a thin intermediate ring of soft magnetic material is provided within the air gap adjacent the stator pole tooth ring, which intermediate ring is firmly connected to the stator at a small distance therefrom. Further improvement in the operation of such a hysteresis motor is provided by utilizing a ring winding for the stator windings which windings enclose the stator yoke, and by varying the number of turns of the strands of the multiphase stator windings in the stator slots so that the peak values of the total flux in all of the slots is the same, and the phase sequences of the flux in adjacent slots enclose the same angle. According to still a further feature, the stator is embedded in a shielding enclosure having thick walls formed from a material with good conductive properties in order to reduce the primary stator yoke stray reactance and thereby improve the power factor of the machine to such an extent whereby less expensive hysteretic material may be utilized for the rotor.

Inventor:
Peter-Konrad Hermann

BY Spencer & Kaye
ATTORNEYS.

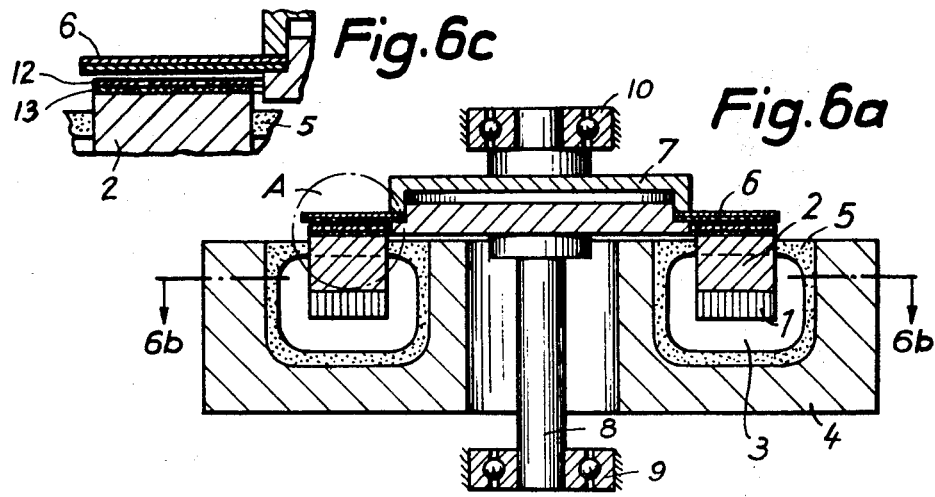
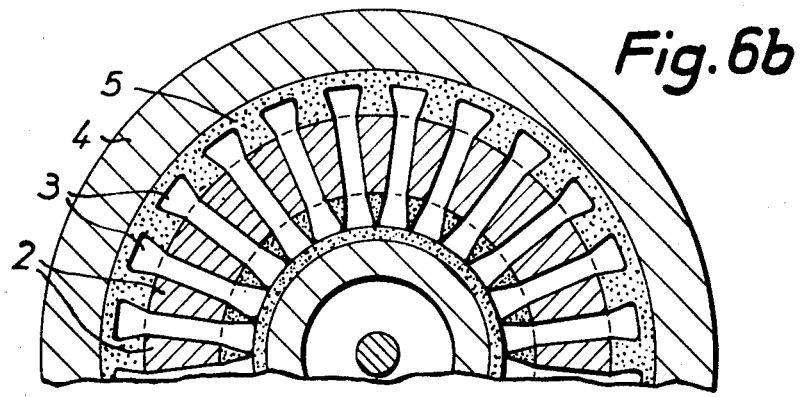
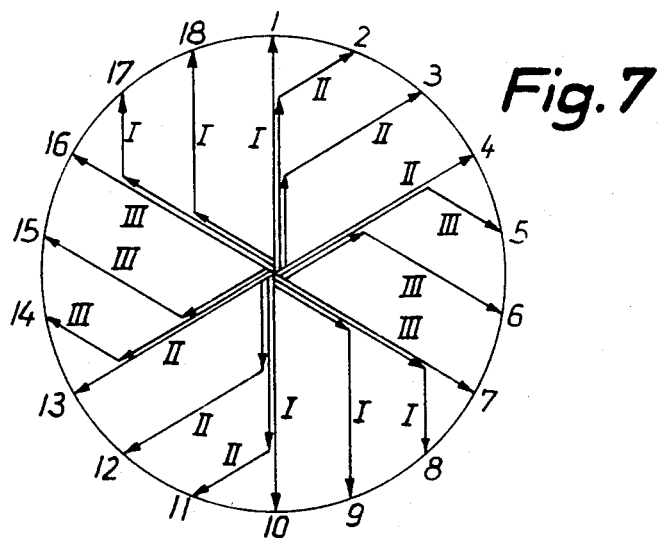

3,610,978

1

HYSTERESIS MOTOR

BACKGROUND OF THE INVENTION

The present invention relates to a hysteresis motor, and more particularly to the design of the stator producing its rotating field, wherein the rotor consists of hysteretic material of such a coercive field strength that the rotating stator field can still change the magnetization of the rotor. As is known, such a hysteresis motor should have a torque-speed characteristic which has a constant torque until it reaches full synchronism. The advantage of this type of motor as compared with an induction motor is that such a motor pulls into synchronism with its full nominal or rated torque and remains in synchronism with a low operating torque entirely synchronized in constant phase position or elastically coupled with the rotating field as does a synchronous motor, whereas an induction motor lags with respect to the rotating field with a load-dependent slip. Since the hysteresis rotor generally consists of a metallic material, eddy currents are induced therein during the asynchronous start-up period, so that an asynchronous induction torque is added to the constant hysteresis torque, which induction torque disappears with approximation to synchronism. This accelerates the starting behavior but does not inhibit the synchronous pullout torque.

Time and space harmonics of the exciting rotating field, however, produce additional eddy currents in the rotor which do not disappear with synchronism of the revolutions with the fundamental frequency and which cause the synchronous pullout torque to fall below the theoretical value which is given by the work of the rotor to reverse the magnetization divided by the full angle of rotation $2\pi$. Even with a magnetic oxide hysteresis rotor in which no eddy currents can be produced by harmonics, it is possible that the synchronous pullout torque will be reduced to a value below the theoretical value due to inner loops, during synchronous operation, in the rotating field which is rich in harmonics.

Whereas it is known to be relatively easily possible with short-pitched or chord windings to sinusoidally distribute the ratio of the total current per stator slot divided by the stator tooth pitch over the circumference and, in the case of a three-phase current supply, to cause the ratio to cycle, at constant angular velocity and with constant amplitude, it is not possible for hysteresis motors to reduce the slot harmonics somewhat by closed stator slots or to substantially suppress them. The increase in the primary stray reactance resulting form closed stator slots would, in any case, be more annoying with hysteresis motors than with induction motors since the power factor of the former type of motor is worse than that of the latter. It should be added that even with closed slots, the stator teeth stand as equipotential surfaces before the rotor and thus cause a drop in the air gap flux density above the teeth at the points of higher longitudinal field strength $H_L$, which drop is greater than that occurring with purely sinusoidal primary stator current distribution ratio without slots, since in this case the stator and rotor potentials are in balance and differ only to the extent that the potential required for the sinusoidal air gap flux remains therebetween. It is possible by means of closed slots to suppress the slot harmonics of the air gap flux density distribution at the poles of the stator flux, which slot harmonics are produced by the differences of the magnetic air gap resistance at the teeth and in the gaps between the teeth. However, it is not possible in this manner to avoid the slot harmonics of the magnetic stator potential which increase stepwise at the points of high flux through the slots at the gaps between the teeth. This interference can also not be effectively reduced, as in induction machines, by lamination of the rotor. This is due firstly to the fact that a laminated hysteresis motor rotor would unduly increase production costs, and secondly to the fact that these slot harmonics of the stator potential cause small inner magnetization reversal loops when the laminated or magnetic oxide hysteresis rotor is in synchronism, which loops bring about a slow decrease of the center rotor magnetization of the device even at torques below the nominal or rated load so that the motor, strictly speaking, no longer rotates synchronously but lags with a slip which although slight with respect to an induction motor is nevertheless noticeable. Consequently for those applications wherein strict synchronism is demanded, e.g., for clock motors or for certain applications with gas centrifuges, it is therefore necessary to make the air gap of the hysteresis motor larger than would otherwise be necessary, or to make the slot separation tighter than is desirable with a view toward production costs, or even to provide a stator without slots in which the primary winding is disposed in the uniform air gap itself. All these measures decrease the power factor and/or increase production costs of the hysteresis motor.

It is accordingly the primary object of the present invention to provide an improved hysteresis motor which eliminates these above-mentioned drawbacks.

SUMMARY OF THE INVENTION

According to the invention, the above-mentioned drawbacks are eliminated by providing a thin soft-magnetic intermediate ring in the air gap of a hysteresis motor in front of the ring of stator pole teeth so that the ring is at a small distance from the stator and is mechanically firmly connected thereto.

Thus the above-described difficulties are avoided in that the thin, soft-magnetic, preferably easily saturable intermediate ring which smoothes the curve of the stator potential and is attached at a small magnetic distance from the ring of pole teeth of the stator and is firmly attached with this stator, itself limits the air gap with respect to the rotor. When this intermediate ring is made of a metallic material, according to another feature of the present invention the ring is preferably subdivided into a plurality of electrically insulated concentric rings, or subdivided into electrically insulated sections in order to reduce or eliminate additional eddy current losses in the intermediate ring.

According to a further feature of the invention, the stator winding is in the form of a ring winding with the individual turns thereof surrounding the yoke portion of the stator. Additionally, the stator winding is preferably provided with a layout such that different numbers of windings or coils of one or two phases of a multiphase winding are provided in each slot so that the phase sequences of the total flux in adjacent slots enclose the same angle, and that the peak values of all the slot fluxes are identical.

According to still a further feature of the invention, the hysteresis motor is in the form of a disc motor having the ring type stator winding as mentioned above, and the stator is placed in a shielding enclosure or cup formed with relatively thick walls of a good conductive material in order to reduce the stray flux from the yoke. The space between the shielding enclosure and the stator is preferably filled with a synthetic resin.

BRIEF DESCRIPTION OF THE DRAWINGS

FIG. 6a is a sectional view, FIG. 6b a plan view, and FIG. 6c an enlarged sectional view of a portion of FIG. 6a of a hysteresis motor of the disc type constructed according to the invention.

FIG. 7 is a diagram illustrating a preferred stator winding layout according to a further feature of the invention.

DESCRIPTION OF THE PREFERRED EMBODIMENTS

Figure 1:
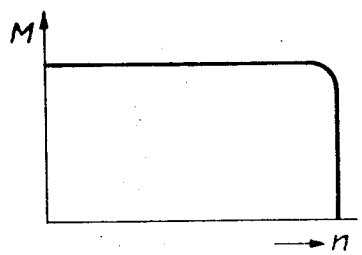
FIG. 1 illustrates the theoretical torque curve of a hysteresis motor plotted against speed.
Figure 2A:
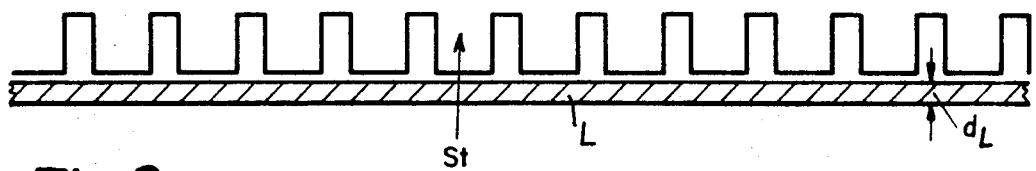
FIGS. 2a and 2b illustrate respectively the schematic development of a portion of the rotor and stator of a hysteresis motor according to the prior art and the curves of the magnetic parameters over the developed portion.

FIG. 1 illustrates, as indicated above, that a hysteresis motor theoretically exhibits a torque-speed characteristic with constant torque up to full synchronism. FIG. 2a shows a development of a section of the stator ($S_t$) and the rotor (L) of a hysteresis motor according to the prior art, i.e., without an intermediate ring adjacent the stator according to the invention.

Figure 2B:
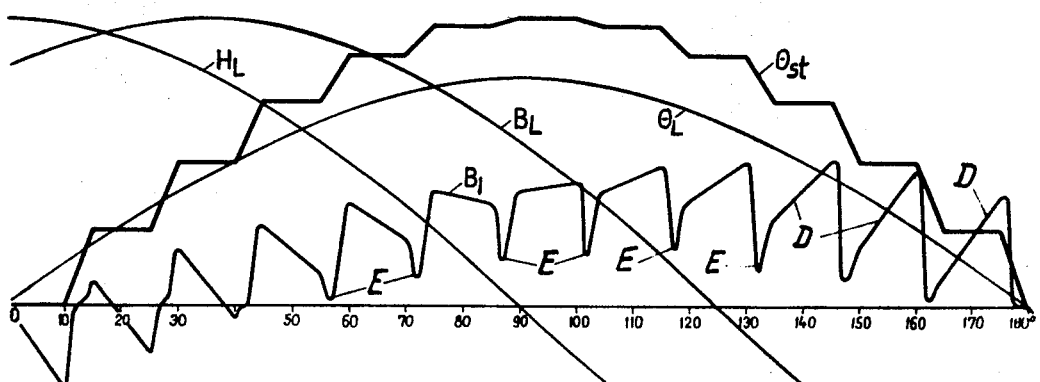
Figure 3A:
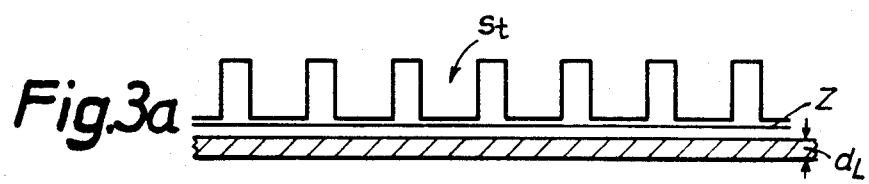
FIGS. 3a and 3b illustrate respectively the schematic development of a portion of the rotor and stator of a hysteresis motor which has been modified to one embodiment of the invention and the curves of the magnetic parameters of the modified motor over the developed portion.
Figure 3B:
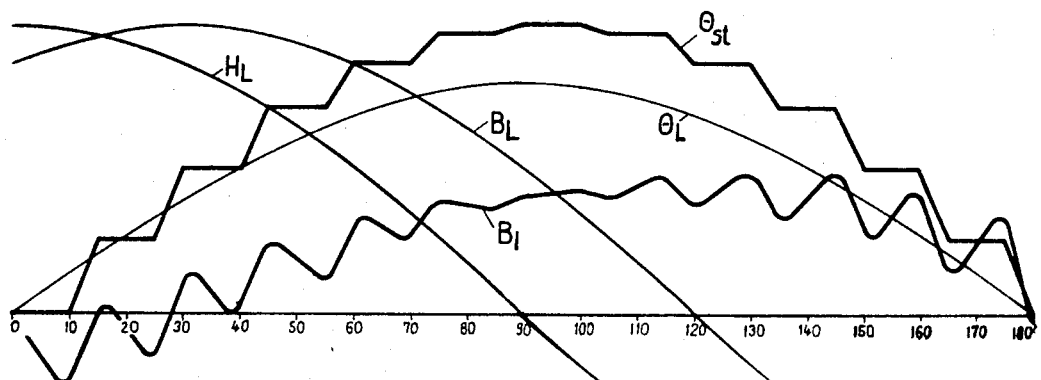

FIG. 2b illustrates the curves of the stator potential $O_{st}$, which changes in steps and which when averaged is sinusoidal, the constantly sinusoidal, somewhat smaller phase-shifted rotor potential $O_L$ and the air gap flux density $B_1$ resulting from the difference of these potentials and the tooth-modulated air gap resistance for the development of stator and rotor constructions shown in FIG. 2a. The curve of the flux density $B_1$ air gap clearly illustrates the slanted or ramp portions D beneath the teeth, and the undesirable tooth gap or slot breaks E; i.e., the slot modulation. FIG. 3a illustrates the corresponding portion of the stator $S_t$ and rotor L which has been modified by the provision of a thin intermediate ring Z of soft-magnetic material according to the invention. As can easily be seen from the corresponding curves in FIG. 3b, the intermediate ring Z weakens the potential jumps in the tooth gaps, and widens them by saturation effects, and bridges the effect of the tooth gaps at the pole points of the stator potential curve $O_{st}$ so that no tooth modulation E, such as shown in FIG. 2, of the magnetic air gap resistance becomes effective in the air gap field between the intermediate ring and the rotor.

Figure 4A:
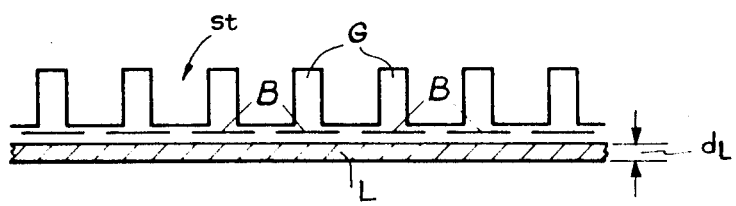
FIGS. 4a and 4b illustrate respectively, the schematic development of a portion of the rotor and stator of a hysteresis motor according to another embodiment of the invention, and the magnetic parameters of the motor over the developed portion.

FIG. 4 illustrates a particularly advantageous modification of the intermediate ring Z according to the present invention and its effect on the magnetic parameters. As shown in FIG. 4a, the intermediate ring Z is subdivided into a plurality of individual wafers or sections B which bridge the tooth gaps or slots G and which overlap the teeth only at the edges of the teeth so that a slight magnetic gap exists between the wafers B. The gaps between the individual wafers B thus not only represent an electric insulation which reduces the eddy current losses in the intermediate ring, but they are also sufficiently wide that the potential of the portion of tooth surface exposed thereby causes a substantial portion of the tooth flux to pass directly to the rotor and not be influenced by the magnetic wafers B of the intermediate ring. At the points of high slot flux these wafers B form a type of magnetic voltage divider since each wafer becomes saturated along the width of the tooth gap or slot G and this saturation flux causes an additional flux effects magnetic potential differences of different signs. The full tooth division is thus subdivided into four portions, two of which are formed by overlapping regions of wafer and tooth, one of which is formed by the tooth gap or slot and the last one of which is formed by the exposed tooth surface between the wafers B. Due to the potential drop caused by the saturation flux of the wafers at the points of overlap, the three portions will have stepped magnetic potentials so that the remaining potential step above the tooth gap is substantially less steep than it would be without such magnetic voltage divider wafers.

The effect of the intermediate ring when subdivided according to the present invention is practically the same as that which could be achieved with three times the number of teeth with regard to a smoothing of the sinusoidal path of the air gap flux density curve $B_1$. However, the effect according to the invention can be produced much more easily because a winding having many grooves is much more expensive than a winding with but a few grooves or slots, and since the realizable copper fill factor of the grooves would become extremely poor with the narrow and deep grooves which would be required.

FIGS. 2b to 4b also show the longitudinal rotor flux density $B_L$ which is phase shifted by 90° with respect to $B_1$ and which results, with an annular rotor, from the integration of the air gap flux density over the rotor periphery, i.e., $d_l \cdot B_L = -\int (B_1 - B_{sl}) \, dx$. Also shown in these figures is the longitudinal field strength $H_L$ in the rotor whose integral about the periphery of the rotor results in the rotor potential $O_L$, i.e., $O_L = \int H_L dx$, and which is also shifted in space by 90° with respect to the rotor potential. In the above equation, $d_L$ is the thickness of the annular rotor L, $B_1$ is the air gap flux density, $B_{sl}$ the rotor stray field at the side away from the stator. The rotor coordinate x relates to the point on the periphery of the stator at the air gap with an arbitrary zero point.

Figure 5:
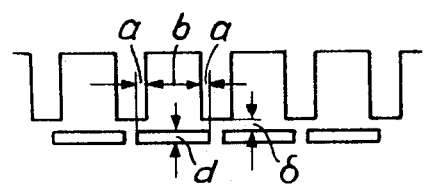
FIG. 5 is a schematic showing of a portion of a stator illustrating the constructive dimensional details for the embodiment of the invention illustrated in FIG. 4.
Figure 4B:
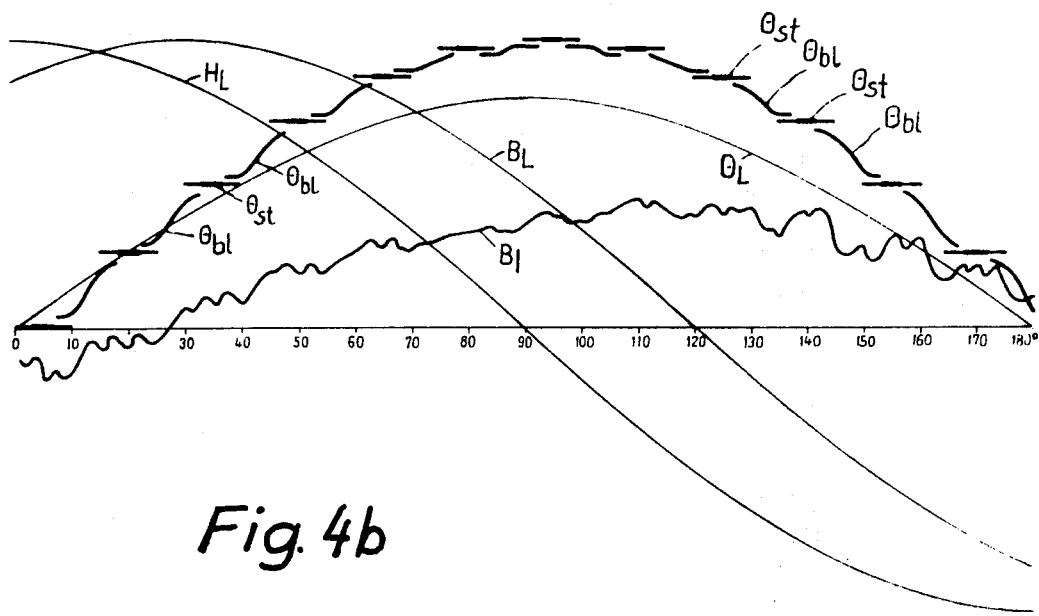

FIG. 4b shows the points corresponding to the center of each tooth in the shape of the tooth potential $O_{st}$ as a solidly drawn curve. In the areas therebetween, the air gap flux density is proportional to the potential difference between the potential of the wafers $O_{b1}$ and the rotor $O_L$. The shape of the portions $O_{b1}$ is shown as S-shaped in the plotted curve as it corresponds to the effect of the saturation of the wafer at the current-carrying slots and to the magnetic transfer resistance toward the teeth. The following formula serves as the dimensioning rule for the dimensioning of the thickness d of the wafers B and for the fixed magnetic gap $\sigma$ between the wafers B and the stator teeth:

$$\sigma = (2a/b) \cdot d$$

where a is the overlap of the wafer B with the adjacent tooth and b is the width of the groove all as shown in FIG. 5.

The thickness d of the intermediate ring Z, and therefore the wafer B, is so selected that the product of saturation flux density $B_s$ and thickness d lies between the product of the peak value of the average air gap flux density $B_1$ and the groove width, and twice that value, that is:

$$\hat{B}_1(b/2) < d B_s < \hat{B}_1 b$$

In FIGS. 2b–4b the spatial angle between $H_L$ and $B_L$ is illustrated as between 30° and 35° which corresponds to an average quality of the hysteresis material in which the peak field strength of the magnetization reversal loop is 1.7 to 2 times as great as the coercive field strength. The illustrated curves in FIGS. 2b–4b correspond approximately to experimental data of a 24-groove hysteresis motor.

The present invention results in a particularly advantageous construction for rapidly rotating hysteresis disc motors as they are suited, for example, for driving ultracentrifuges, particularly gas centrifuges for the separation of isotopes. Such a motor is shown in FIG. 6. It has bi-polar windings and is fed with alternating current of more than 1000 Hz. so that the synchronous speed lies above 60,000 r.p.m. In FIG. 6a and FIG. 6b, which is a sectional view taken along the plane 6b—6b of FIG. 6a, reference numeral 1 is an annular band core or yoke for the stator onto which the stator teeth 2 are mounted. The motor is also provided with a winding 3 which is around the yoke 1 between the stator teeth 2. For reasons to be explained below, the stator including yoke 1, teeth 2 and winding 3, is inserted into a shielding enclosure cup, or trough 4 and the space therebetween is filled with a casting mass 5. The rotor of the hysteresis disc motor comprises rotor sheets supported by a rotor hub 7 mounted on a rotor shaft 8. The shaft 8 is, in turn, rotatably mounted in a pair of bearings 9–10.

At high frequencies, eddy current losses in the rotor, which are induced in synchronism by the slot harmonic of the air gap flux density distribution at 24,000 Hz. play a considerably interfering part. These slot harmonics are better removed by the arrangement of an intermediate ring according to the invention than by an empirically optimally enlarged air gap in embodiments without such a magnetic intermediate ring.

Accordingly, as best shown in FIG. 6c which is an enlarged view of the encircles portion A of FIG. 6a, a thin ring of soft-magnetic material 12 is inserted into the air gap between the stator teeth 2 and the rotor sheets 6, and is positioned adjacent to and slightly separated from the tips of the stator teeth 2. In the illustrated embodiment of the invention, the intermediate ring 12 is firmly connected to the stator by means of a thin layer of a nonmagnetic insulating material 13 which is interposed between and bonded to the ring 12 and the tips of the stator teeth 2. Although a segmented intermediate ring such as shown in FIG. 4a could be utilized, as illustrated, the ring 12 is preferably formed by three concentric ring portions in order to reduce the eddy currents therein.

In such a hysteresis motor intended for extremely high speeds and frequencies, great emphasis is placed on the formation of a rotating field flux which is as free as possible of harmonics and poor in harmonic oscillations. The above-described arrangement, i.e., the provision of the intermediate ring 12, concerns the prevention of the slot harmonic. However, according to a further feature of the invention, an important above-average improvement is achieved by providing a stator winding which results in uniform phase sequences and amplitude conformity of the individual current penetrations in subsequent slots. For example, whereas it is entirely sufficient for induction motors for lower speeds to distribute, the individual winding strands in a three-slot winding to four adjacent slots of which the center two slots are covered with one-third of the number of strand windings $n$ and the outer two slots are each covered with $1/6\ n$, so that only one-third of all slots are covered with windings from different strands, it is advantageous for hysteresis motors, which are more sensitive to harmonics, and at high frequencies of operation, to divide the number slot winding according to the vector lengths of the three phases, such as, for example, as shown in FIG. 7 for bipolar three-slot AC windings with 18 slots per circumference. In this arrangement only one-third of all slots are then filled with the windings of just one strand so that two-thirds of all slots require a special intermediary insulation between the windings belonging to different strands and, a higher total number of windings will be required in those slots which hold windings from two strands. This winding arrangement results in the phase sequences of the total flux in adjacent slots being a uniform 20° (electrical and mechanical), and the peak value of all slot fluxes being identical, whereas in the above-mentioned conventional division, the phase sequences of adjacent slots correspond to the series 30°, 30°, 0°, 30°, 30°, ° ... and the amplitude sequence is 1.0; 1.0; 0.87; 1.0; 1.0; 0.87... Such perfectionized stator windings are almost impossible to realize with the conventional form of drum windings where the windings of one slot close over the winding heads in the slots with different pitch which are removed by one pole pitch. However, it is possible to achieve such a stator with a ring winding which will be described below. With extremely high speed motors, bi-polar machines are preferred in order that a lower input frequency can be utilized and thus not cause the remagnetization losses of the soft magnetic components of the motor and the eddy current losses caused by the stray fields in the armatures to become too high. In these bi-polar stator windings, the winding heads often become much longer than the active winding lengths in the slots. This is not so only when a long active machine length is provided for a small diameter such as is advantageous, in any case, for high speeds and torques which are as high as possible in view of the centrifugal stress on the rotor.

When constructing high-speed hysteresis motors, however, there is no such distinct limitation of the permissible peripheral speeds as with cage rotors in induction motors due to the high tearing resistance of the hysteresis material which comprises the active outer ring of the rotor.

In the particularly important field of application of high-speed hysteresis motors for centrifuge drives, the difficulties of providing bearings for the extremely high speeds and of mounting the motor in a vacuum are increased due to the difficulty of providing a suitable bearing lubrication and the fact that the rotor of the drive motor must be attached in overhung position at the end of the centrifuge body in a manner whereby the axis of rotation of this supercritically rotating body must be free. For this reason, a motor having a small rotor diameter and long length is not suited for this purpose. The motor must rather be a disc motor, i.e., have an air gap whose plane is perpendicular to the axis. The active slots then extend radially and the active slot length is so small with respect to the average active diameter that the conventional drum windings would produce improportionally long winding heads when considered in the light of the active slot length. For the two above-mentioned reasons the winding according to the invention is preferably a ring winding in which the windings of one slot close around the yoke ring in the same slot or in an adjacent slot. Such a ring winding is indicated by the reference numeral 3 in FIG. 6. With such a ring winding, the above-discussed winding layout (FIG. 7) which is perfect with respect to phase sequence and amplitude uniformity can be produced without any additional manufacturing expenses, e.g., by means of annular winding machines as are known for miniature transformers and converters.

One drawback of a ring winding for the stator with respect to a drum winding is the higher stray field reactance of the primary winding which is produced when the yoke ring does not represent an equipotential magnetic return as in a drum winding, but is provided over its entire periphery with the same rotating field potential as the active pole tooth ring at the air gap of the machine.

According to a further feature of the invention, the entire machine stand is thus embedded in a shielding cup or enclosure, i.e., enclosure 4 of FIG. 6a, which closely surrounds the windings 3 of the stator and which has such a wall thickness that the eddy currents induced in this shielding enclosure exhibit approximately the same flux as the primary winding even at a small fraction of the yoke stray flux. The shielding enclosure then takes over the function of the winding heads of a drum winding in that it reduces the yoke stray flux to a small fraction of the stray flux of an unshielded annularly wound stator. The resulting structure, particularly when utilizing perfectionized rotary field winding results described above, results in a much simpler and cheaper construction for the stator than construction of a stator having a drum winding with winding heads and, moreover, it is magnetically more favorable than the latter.

The reduction of the primary yoke stray reactance with the aid of a heavy-walled shielding cup 4 improves the power factor of the hysteresis motor according to the present invention, particularly for ultracentrifuge drives, to such an extent that it is not necessary to use the magnetically most favorable, but more expensive, hysteresis material for the rotor. This is a material with a hysteresis curve which is as rectangular as possible and in which the peak field strength required to be passed through the hysteresis surface to determine the torque (as described above) is hardly any greater than the coercive field strength. A material, in which the peak field strength need be only 1.5 times the coercive field strength to produce the same torque in the rotor as another material in which a peak field strength of four times the coercive field strength is required, costs more than 20 times as much and is a significant factor in the total price of the motor, particularly when manufactured in large quantities.

By making it possible to use the magnetically lower-quality rotor material with the stator construction of the present invention there results the further advantage that the rotor may be a direct part of the walls of the centrifuge vessel, so that a shorter structural length can be achieved than was possible with separate rotors due to the fact that such separate motor rotors must be magnetically separated from the centrifuge body. Consequently the mass of the machine part which now becomes effective as both the centrifuge cover and the motor rotor can be reduced. Such a reduction in mass makes possible a longer active centrifuge length and thus improves its effectiveness.

Without the measures which according to the present invention improve the rotating field with respect to the slot harmonic as well as with respect to the perfectionized windings, such a combination of centrifuge cover and motor rotor is not permissible for the reason that the eddy currents and magnetization reversal losses in the rotor, which are also induced in synchronism by the harmonics content of the rotating field, cause the centrifuge cover, which rotates in a vacuum without convection cooling, to be heated. Such heating would adversely influence the usefulness of a gas centrifuge.

A stator without teeth in which the winding is directly disposed in the active air gap can produce no comparable or better results than the present invention because this requires very high current densities in the winding copper which would cause an unpermissible heating in the active copper of the air gap, even with ideal water cooling at the winding return enclosing the yoke.

It will be understood that the above description of the present invention is susceptible to various modifications, changes and adaptations, and the same are intended to be comprehended within the meaning and range of equivalents of the appended claims.

I claim:

1. In a hysteresis motor having a rotor and a stator operatively mounted with respect to one another and defining an air gap therebetween with the surface of said stator adjacent said air gap being provided with a plurality of pole teeth, the improvement comprising a thin intermediate ring of soft magnetic material disposed is said air gap adjacent said stator pole teeth, said ring being firmly mechanically connected to said stator at a small distance therefrom and comprising a plurality of electrically insulated individual wafers which bridge the slots between said stator teeth, the thickness $d$ of said wafers and their distance $\sigma$ from said stator teeth being related to one another according to the following equation: $\frac{\delta}{d} \sim \frac{2a}{b}$, where $a$ is the distance the wafer overlaps the tips of adjacent stator teeth and $b$ is the width of the said slots between said stator teeth.

2. A hysteresis motor as defined in claim 1 wherein the thickness $d$ of the said wafers is such that the limit condition
$$\hat{B}_1(b/2) < d\, B_s < \hat{B}_1 b$$
is not substantially exceeded, where $B_1$ is the peak value of the average induced air gap flux density and $B_s$ is the saturation flux density of the intermediate ring material.

3. In a hysteresis motor having a rotor and a stator operatively mounted with respect to one another and defining an air gap therebetween with the surface of said stator adjacent said air gap being provided with a plurality of pole teeth, and a thin intermediate ring of soft magnetic material disposed in said air gap adjacent said stator pole teeth, said ring being firmly mechanically connected to said stator at a small distance therefrom, the improvement wherein the stator is wound in the form of a ring winding with coils which lie within said slots and encircle the yoke of said stator and wherein different numbers of coils of one or two phases of a multiphase winding are provided in each of said slots so that the peak value of the total flux in all of the said slots is identical and the phase sequences of the total flux in adjacent slots enclose the same angle.

4. A hysteresis motor as defined in claim 3 wherein the hysteresis motor is a disc motor.

5. A hysteresis motor as defined in claim 4 wherein the stator is embedded in a shielding cup having thick walls and consisting of a material with good conductive properties.

6. A hysteresis motor as defined in claim 5 wherein the space between the stator and the shielding cup is filled with synthetic resin.

7. A hysteresis motor as defined in claim 2 wherein the stator is wound in the form of a ring winding with coils which lie within said slots and encircle the yoke of said stator and wherein different numbers of coils of one or two phases of a multiphase winding are provided in each of said slots so that the peak value of the total flux in all of the said slots is identical and the phase sequences of the total flux in adjacent slots enclose the same angle.